June 1, 1943.  H. SAHLIN  2,320,659
MATERIAL HANDLING DEVICE
Filed Sept. 17, 1941  3 Sheets-Sheet 1

INVENTOR.
HENRY SAHLIN.
BY
Barnes, Kisselle, Laughlin & Raisch
ATTORNEYS.

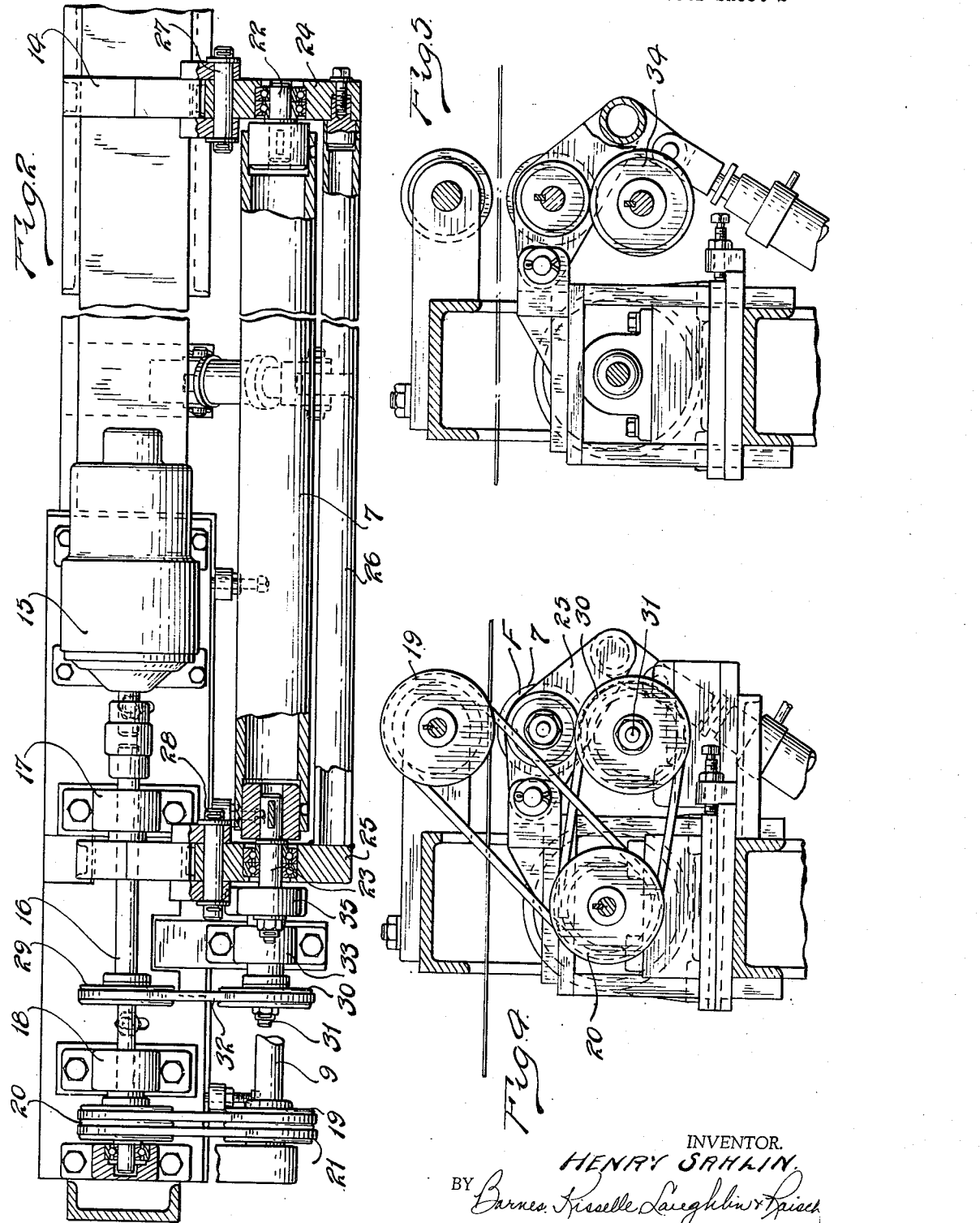

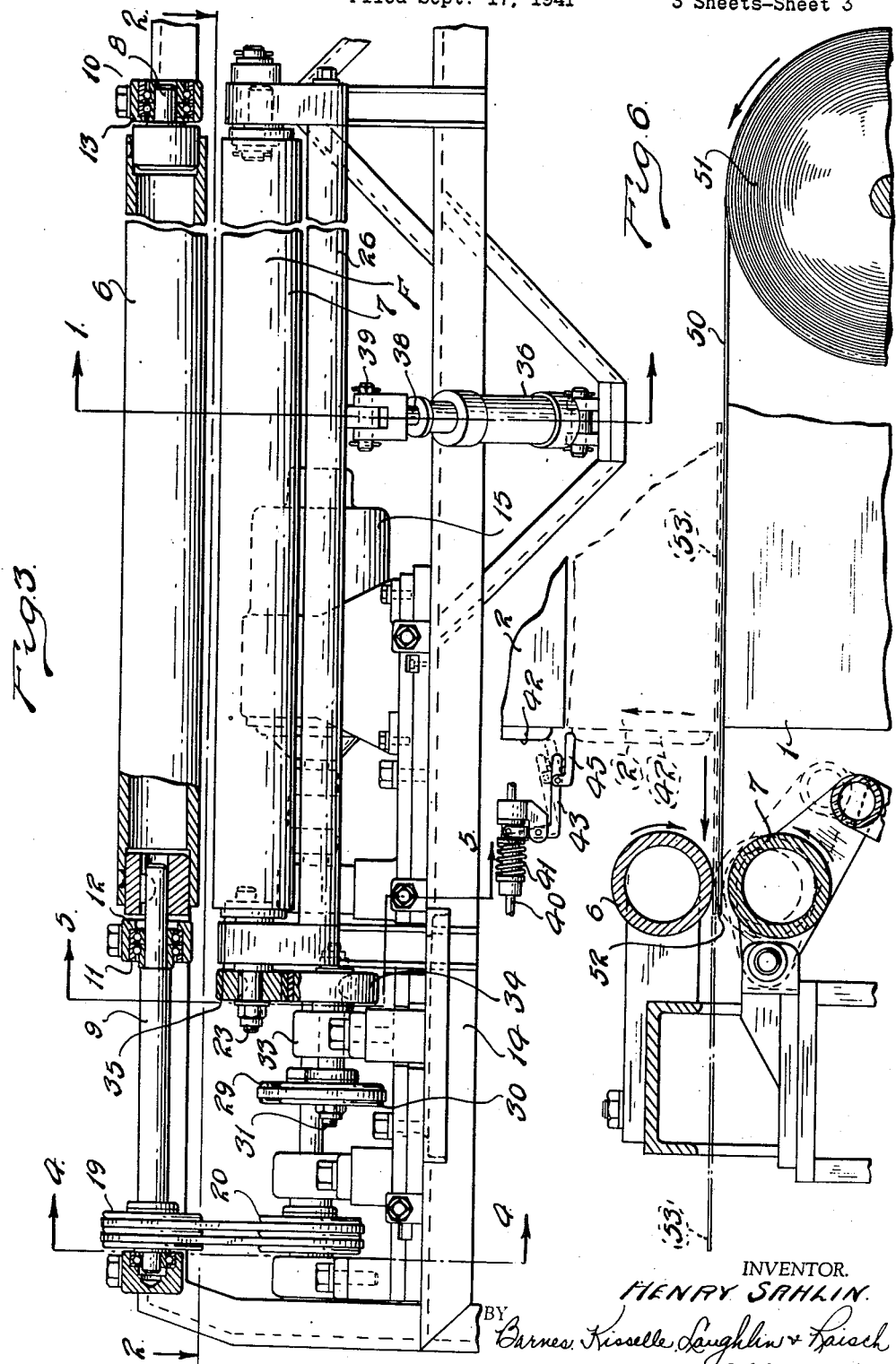

Patented June 1, 1943

2,320,659

UNITED STATES PATENT OFFICE 2,320,659

MATERIAL HANDLING DEVICE

Henry Sahlin, Detroit, Mich., assignor to General Motors Corporation, Detroit, Mich., a corporation of Delaware Application September 17, 1941, Serial No. 411,093

9 Claims. (Cl. 164—49)

This invention relates to a material handling device and more particularly to a device useful either for loading or removing work from a machine. The device is particularly useful for removing flat pieces of material from a press or for loading flat pieces of material into a press.

A device for unloading or loading a press, for example, must perform without scratching or scoring the work. It is the object of this invention to produce a material handling device which will efficiently load or unload a press or other machine without scoring or scratching the work.

Another advantage of the present device is that it eliminates the need for manually reaching into and removing the work from the press or other machine which is accompanied by considerable risk. Thus, this device makes the operation of a machine, such as a press, more safe.

In the drawings:

Fig. 2 is a top plan view partly in section along the line 2—2 of Fig. 3.

Fig. 3 is a front elevation of the machine.

Fig. 4 is an end elevation partly in section along the line 4—4 of Fig. 3.

Fig. 5 is a section along the line 5—5 of Fig. 3.

Fig. 6 is a sectional view similar to Fig. 1 showing the device used as a work remover.

Figure 1:
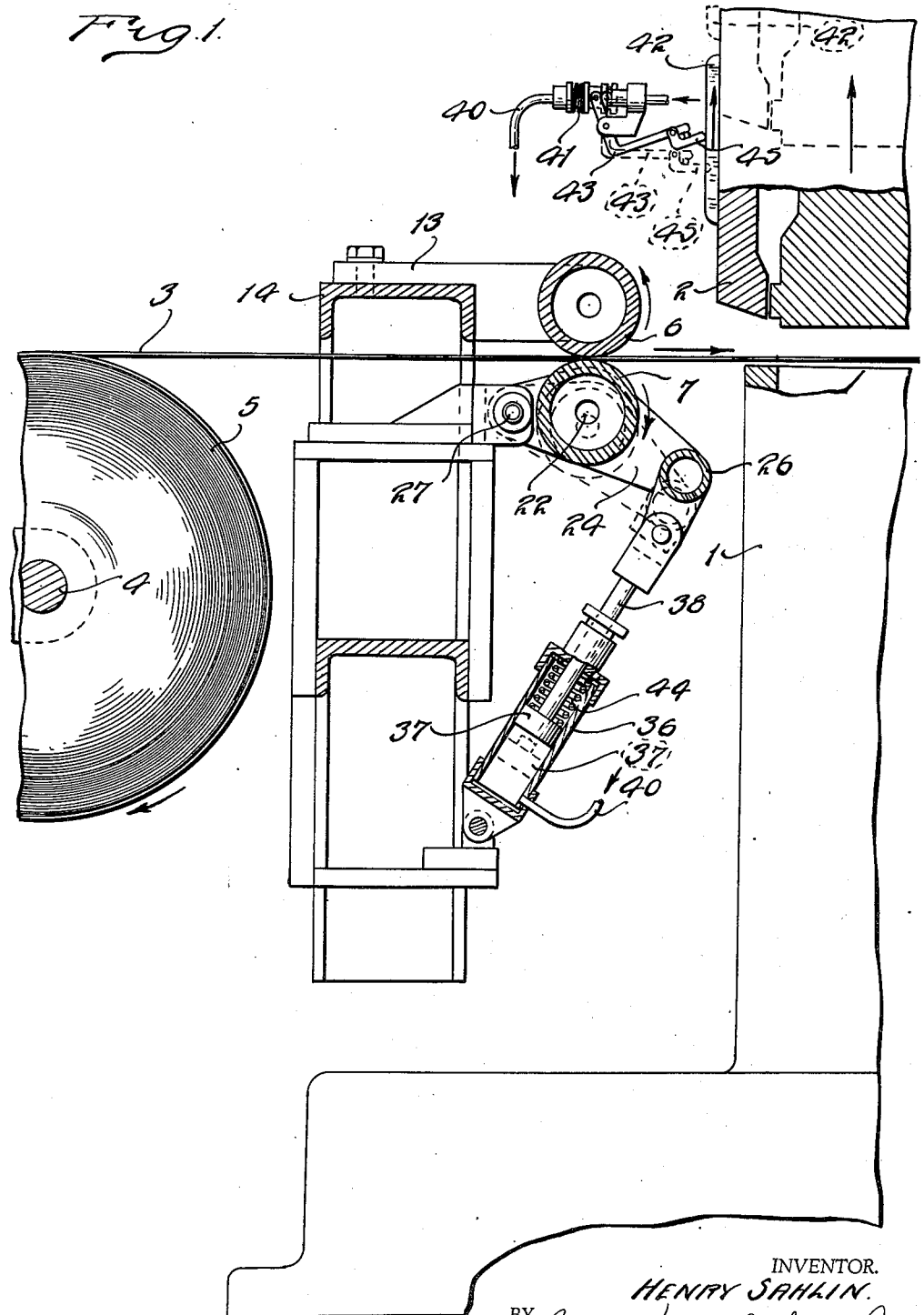
Fig. 1 is a vertical section through the material handling device along the line 1—1 of Fig. 3 showing the device used as a work loader.

For purposes of description the device is shown for use on a blanking press comprising a lower stationary die 1 and an upper reciprocating die 2. The press operates on a metal strip 3 to cut it into blanks of a predetermined size. The strip 3 comes in the form of a coil 5 rotatably supported on the spindle 4.

The device for feeding the strip into the press comprises a pair of rollers, the upper of which is designated 6 and the lower of which is designated 7. Rollers 6 and 7 can be made from any suitable material. Where the device is operating on strip steel, such as designated 3, steel rollers have been found satisfactory. The upper roller 6 is fixed upon a pair of stub shafts 8 and 9 mounted in ball bearing races 10 and 11 respectively. The races 10 and 11 are supported in the brackets 12 and 13 which are bolted or otherwise secured to the main frame 14 of the device.

Roller 6 is positively driven by means of an electric motor 15, the shaft of which is coupled to driving shaft 16 which is journaled in stationary supports 17 and 18. Pulleys 19 and 20 are fixed respectively on shafts 9 and 16. V belts 21 transmit the drive from pulley 20 to pulley 19. Therefore, the drive from motor 15 to upper roller 6 comprises shaft 16, pulley 20, belts 21, pulley 19 and shaft 9.

Roller 7, during the removal or feeding of the work 3, is an idling roller. It is essential that the roller 7 should be traveling at the same angular speed as the roller 6 when it comes in contact with the work so that the work will be gripped evenly and not scratched. As herein shown, by way of description, the roller 7 is of the same size or diameter as the roller 6 so that to achieve the same angular or surface speed between the rollers 6 and 7 it is only necessary to have each make the same number of revolutions per minute. To this end roller 7 is fixed at each end on a pair of stub shafts 22 and 23 which are journaled in brackets 24 and 25 respectively. A brace in the form of a tubular member 26 is fixed at one end to bracket 24 and at the other end to bracket 25 to secure the same together. Brackets 24 and 25 are pivotally supported by means of pins 27 and 28 upon the main frame member 14. Thus, the roller 7 can be moved upwardly and downwardly by swinging the frame member 24, 25, 26 about its pivots 27 and 28.

The roller 7 is driven off of the main drive shaft 16 by means of a belt and pulley drive consisting of pulley 29 fixed on shaft 16, pulley 30 fixed on shaft 31 and belt 32. Shaft 31 is journaled in bearing support 33 which is mounted on the main frame 14 of the device. A driving roller 34 is fixed on the end of shaft 31 opposite the pulley 30. This roller 34, when the roller 7 is lowered, drives roller 35 fixed on stub shaft 23 which supports one end of roller 7 (Fig. 2). Thus, the drive for roller 7 consists of motor 15, shaft 16, pulleys 29 and 30, belt 32, shaft 31, rollers 34 and 35. This drive is arranged so that the roller 7 rotates at the same speed as the roller 6.

For raising and lowering the roller 7 there is provided an air cylinder 36, piston 37 therein having a rod 38 connected to pivoted frame member 26 by pin 39. An air line 40 connects the cylinder 36 with a source of compressed air (not shown). A valve generally designated 41 is inserted in the air line 40. This valve is a conventional well-known valve which in one position connects the cylinder 36 with a source of compressed air (full line showing, Fig. 1) and in open position closes off the line to the source of compressed air and exhausts the cylinder 36 to atmosphere.

The operation of the device is as follows: Motor 15 and drive shaft 16 run continuously so that roller 6 and driving roller 34 are rotating continuously. After the die 2 has cut a blank from strip 3, it starts on its upward travel. As shown in Fig. 1, the upper die 2 of the press is on the way up. Cam 42 has swung pivoted lever 43 upwardly to the full line position, Fig. 1, thus operating valve 41 so that cylinder 36 is in communication with the source of compressed air. This has caused air cylinder 36 to raise roller 7 to the position shown in the full lines, Fig. 1, so that the metal strip 3 is gripped between rollers 6 and 7 and moved in the direction of the arrow to feed the same into the press. As shown in the dotted lines, Fig. 1, as soon as finger 45 rides off of the lower end of the cam 42, valve 41 will shut off cylinder 36 from the source of compressed air and exhaust the same to atmosphere whereupon piston 37 will move downwardly under the action of compression spring 44 in cylinder 36 to lower roller 7, to the dotted line position, out of engagement with the strip 3. As soon as roller 7 moves away from roller 6, the strip 3 likewise falls slightly away from, and out of driving relation with roller 6 and thus the feed of the work automatically stops.

The downstroke of the die 2 does not affect valve 41 because cam 42 rides by the pivoted finger 45 carried on lever 43 and the cylinder 36 remains open to atmosphere. However, on the return or upstroke of the die 2, cam 42 acts through pivoted finger 45 and lever 43 to shift the valve 41 to the position shown in the full lines and again place cylinder 36 in communication with the source of compressed air which raises roller 7 so that the work 3 is gripped between rollers 7 and 6 and fed into the press as indicated by the arrow.

Whenever the roller 7 is lowered, rollers 34 and 35 are in driving relation so that the roller 7 rotates at the same speed as the roller 6. When the roller 7 is raised, roller 35 is withdrawn from driving engagement with roller 34. But the raising of the roller 7 into engagement with the work is practically instantaneous so that due to the inertia of the roller its speed is the same as that of roller 6 when these rollers grip the strip 3 between them and feed the strip into the press.

In Fig. 6 the device is identical with that described above except that it is here arranged for withdrawing the blank from the press rather than for feeding the strip into the press. In this case the sheet steel strip 50 comes in the form of a coil 51 which is intermittently driven by means (not shown) to feed the strip 51 into the blanking press. It will be noted that the end 52 of the strip 50, prior to being blanked, is fed between rollers 6 and 7, roller 7 at this time being lowered. The blank which is cut from strip 50 is designated 53.

As shown in Fig. 6 in the full lines, the roller 7 is lowered because valve 41 has closed off the source of compressed air and opened cylinder 36 to atmosphere. The die 2 is on the way down and thus cam 42 will pass by pivoted finger 45 without operating valve 41 which has cylinder 36 in communication with the atmosphere. As soon as the blank 53 is cut from strip 50, die 2 starts upwardly whereupon cam 42 strikes finger 45 and shifts lever 43 to the dotted line position Fig. 6, which operates valve 41 to place cylinder 36 in communication with the source of compressed air. At this time roller 7 is elevated quickly whereupon it cooperates with roller 6 to grip the cut blank 53 and remove the same leftward out of the press in the direction of the arrow. The position of the cut blank 53 when gripped between rollers 6 and 7 is shown in Fig. 6. The feeding of the strip 50 into the press will, of course, be arranged to take place while the die 2 is raised and while the blank 53 is being removed or immediately thereafter.

It is evident from the above that this material handling device is efficient in operation, will load or unload the work as fast as the press can operate on the same, and that it will thus speedily load or unload the press without injuring the work.

I claim:

1. A material handling device for handling material without scratching or marring the same comprising a pair of rollers adapted to move relatively toward and away from each other and to receive work therebetween, means for driving the rollers at substantially the same speed, the said means directly driving one of the said rollers continuously and directly driving the other of said rollers only when the rollers are moved relatively away from each other whereby when the rollers are moved toward each other they are both rotating at substantially the same speed and grip the work therebetween and transport the same and the second mentioned roller serves as an idling pressure roller.

2. A material handling device for handling material without scratching or marring the same comprising a pair of rollers, one of said rollers being shiftable toward and away from the other roller, means for continuously driving one of said rollers, and means for driving the other of said rollers only when shifted away from the continuously driven roller, said rollers being adapted to receive work therebetween whereby the rollers while both are rotating can be brought together to grip the work and transport the same and said other roller serves as an idling pressure roller.

3. A material handling device comprising a pair of rollers, a stationary support for one of said rollers and a shiftable support for the other of said rollers whereby the rollers can be shifted toward each other to grip and transport work therebetween and away from each other to release the work, and means for driving the rollers at substantially the same speed, the said means continuously driving one of said rollers and driving the other of said rollers only when shifted away from the continuously driven roller whereby when the shiftable roller is shifted towards the other roller to grip the work it rotates as an idling pressure roller at substantially the same speed as the other roller and grips the work without scratching the same.

4. A material handling device comprising a pair of rollers, a stationary support for one of said rollers and a shiftable support for the other of said rollers whereby the rollers can be shifted toward each other to grip and transport work therebetween and away from each other to release the work, means for driving the rollers at substantially the same speed, the said means continuously driving one of said rollers and driving the other of said rollers only when shifted away from the continuously driven roller whereby when the shiftable roller is shifted towards the other roller to grip the work it rotates as an idling pressure roller at substantially the same speed as the other roller and grips the work without scratching the same, and means for shifting the shiftable roller toward and away from the other roller.

5. A material handling device comprising a pair of rollers adapted to receive work therebetween, a stationary support for one of said rollers, a shiftable support for the other of said rollers, means for continuously driving the one roller while the device is in operation, and means including a breakable driving connection for driving the shiftable roller only when shifted away from the other roller free from the work, and means for shifting the said roller toward the other roller whereby the driving connection for the shiftable roller is broken and the same freewheels as it moves toward the other roller into gripping relation with the work whereupon the said shiftable roller serves as an idling back up roller for the continuously driven roller as the work is transported.

6. A material handling device comprising a pair of opposed rollers adapted to grip work therebetween and transport the same, one of said rollers being shiftable toward and away from the other roller, means for continuously driving one of the said rollers when the device is operating whereby said roller serves as the driving roller for transporting the work, and means for driving the shiftable roller only when shifted away from the other roller out of work gripping and transporting position, the said means driving the said rollers at substantially the same speed whereby when the shiftable roller is shifted out of driving relation with its driving means it rotates freely at substantially the same speed and in the same direction at the point of contact with the work as the other roller and upon engaging the work serves as an idling back-up roller for the other roller in the transporting of the work.

7. A material handling device comprising a first roller, a second roller, and a third roller, a stationary support for the first and second rollers, a shiftable support for the third roller whereby the third roller can be shifted toward and away from the first and second rollers, means for continuously driving the first and second rollers when the device is in operation, the first and third rollers adapted to receive and grip work therebetween for transporting the same, and means for driving the third roller from the second roller when the third roller is shifted toward the second roller and out of work gripping relation with the first roller, the first and third rollers being driven at substantially the same speed whereby when the third roller is shifted toward the first roller the driving connection with the second roller is broken and the third roller cooperates with the first roller to grip the work therebetween and transport the same, the first roller serving as the driving roller for the work and the third roller serving as a back-up roller for holding the work against the first roller.

8. In combination with a press having stationary and reciprocating die members, a device for transporting the work relative to the press comprising a pair of rollers adapted to move relatively toward and away from each other and to grip the work therebetween, and means synchronized with the said press for bringing the rollers into gripping relation with the work to transport the same relative to the press when the stationary and reciprocating dies are separated, means for continuously driving one of said rollers and for driving the other of said rollers only when shifted away from the other roller in non-work gripping position, the said means driving each of the rollers at the same speed whereby when the rollers are brought into work gripping position the work is gripped evenly and without scratching or scoring the work and said other roller serves as an idling pressure roller.

9. In combination with a press having a stationary and a reciprocating die, comprising a pair of rollers positioned adjacent the press and adapted to receive the work therebetween, one of said rollers being shiftable toward and away from the other of said rollers, means for continuously driving the one roller and means for driving the shiftable roller at substantially the same speed as the other roller only while the shiftable roller is away from the other roller, and means controlled by the operation of the press for shifting the shiftable roller toward the other roller into work gripping position when the dies are separated whereby the shiftable roller is rotating freely as it contacts the work and serves as a back-up roller for the other roller in transporting the work relative to the press.

HENRY SAHLIN.